US012657443B2

(12) United States Patent
Park et al.

(10) Patent No.: US 12,657,443 B2
(45) Date of Patent: Jun. 16, 2026

(54) HARDWARE-BASED ARTIFICIAL NEURAL NETWORK DEVICE

(71) Applicants: SEOUL NATIONAL UNIVERSITY R&DB FOUNDATION, Seoul (KR); INHA UNIVERSITY RESEARCH AND BUSINESS FOUNDATION, Incheon (KR)

(72) Inventors: Byung-Gook Park, Seoul (KR); Sungmin Hwang, Seoul (KR); Junsu Yu, Seoul (KR); Hyungjin Kim, Seoul (KR)

(73) Assignees: SEOUL NATIONAL UNIVERSITY R&DB FOUNDATION, Seoul (KR); INHA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 933 days.

(21) Appl. No.: 17/953,909

(22) Filed: Sep. 27, 2022

(65) Prior Publication Data

US 2023/0147403 A1 May 11, 2023

Related U.S. Application Data

(63) Continuation of application No. PCT/KR2022/010086, filed on Jul. 12, 2022.

(30) Foreign Application Priority Data

Nov. 11, 2021 (KR) ........................ 10-2021-0154893

(51) Int. Cl.
*G06N 3/063* (2023.01)

(52) U.S. Cl.
CPC .................................. *G06N 3/063* (2013.01)

(58) Field of Classification Search
CPC ..................................................... G06N 3/063
See application file for complete search history.

(56) References Cited

U.S. PATENT DOCUMENTS 11,133,058 B1 9/2021 Philip et al.
2004/0233709 A1 11/2004 Tsuchida et al.
(Continued)

FOREIGN PATENT DOCUMENTS

KR 20070029831 3/2007
KR 101564706 B1 10/2015
(Continued)

OTHER PUBLICATIONS

Burr, Geoffrey W., et al. "Experimental demonstration and tolerancing of a large-scale neural network (165 000 synapses) using phase-change memory as the synaptic weight element." IEEE Transactions on Electron Devices 62.11 (2015): 3498-3507. (Year: 2015).*
Ambrogio, Stefano, et al. "Equivalent-accuracy accelerated neural-network training using analogue memory." Nature 558.7708 (2018): 60-67. (Year: 2018).*
(Continued)

*Primary Examiner* — Randall K. Baldwin
(74) *Attorney, Agent, or Firm* — CANTOR COLBURN LLP

(57) ABSTRACT

A hardware-based artificial neural network device includes a synaptic array including a plurality of capacitor-based synaptic cells, each having a variable capacitance according to a recorded weight, a word line selection unit including a plurality of switching elements respectively connected to word lines of the synaptic array, a bit line charging unit including a plurality of switching elements, each being connected to one end of each of bit lines of the synaptic array, and a bit line discharging unit including a plurality of switching elements, each being connected to the other end of each of the bit lines of the synaptic array.

10 Claims, 10 Drawing Sheets

(56)  References Cited

U.S. PATENT DOCUMENTS

| | | | |
|---|---|---|---|
| 2006/0002178 A1* | 1/2006 | Womack | G11C 29/832 |
| | | | 365/154 |
| 2018/0232628 A1* | 8/2018 | Park | G06N 3/063 |
| 2020/0117984 A1 | 4/2020 | Li et al. | |
| 2021/0241081 A1 | 8/2021 | Sung et al. | |
| 2023/0177107 A1* | 6/2023 | Demasius | G06F 1/08 |
| | | | 708/200 |
| 2024/0111987 A1* | 4/2024 | Yang | G06N 3/065 |

FOREIGN PATENT DOCUMENTS

| | | |
|---|---|---|
| KR | 20190051766 | 5/2019 |
| KR | 101997868 | 7/2019 |
| KR | 20200068560 | 6/2020 |
| KR | 20210034172 | 3/2021 |
| KR | 20210087389 | 7/2021 |

OTHER PUBLICATIONS

Kang, Won-Mook, et al. "Hardware-based spiking neural network using a TFT-type AND flash memory array architecture based on direct feedback alignment." IEEE Access 9 (May 2021): 73121-73132. (Year: 2021).*

Kim, Hyungjin, et al. "Spiking neural network using synaptic transistors and neuron circuits for pattern recognition with noisy images." IEEE Electron Device Letters 39.4 (2018): 630-633. (Year: 2018).*

Minucci, Umberto, et al. "A Neural Network implemented on NAND memory." 2020 IEEE International Memory Workshop (IMW). IEEE, 2020. (Year: 2020).*

Kwon, et al., Capacitive Neural Network Using Charge-Stored Memory Cells for Pattern Recognition Applications, IEEE Electron Device Letters, vol. 41, No. 3, Mar. 2020, pp. 493-496.

* cited by examiner

100

HARDWARE-BASED ARTIFICIAL NEURAL NETWORK DEVICE

BACKGROUND

1. Technical Field

The present disclosure relates to a neuromorphic device or a hardware-based artificial neural network device.

2. Related Art

Recently, a computing technology based on an artificial neural network has been developed, and research on a hardware-based neural network is being actively performed.

A general computing device uses a von Neumann computer architecture having a structure in which a central processing unit (CPU) and a memory device are connected in series to each other, and there is a problem that, when a software-based artificial neural network is applied thereto, a large amount of energy is consumed in a learning and reasoning process.

As an alternative to this, a neuromorphic device, which has been actively studied in recent years, may solve problems of the known computing architecture and particularly reduce power consumption while increasing performance of an artificial neural network.

A neuromorphic device includes a synaptic element that mimics a synapse and represents a weight of a signal based on conductivity of the synaptic element, and recently, a nonvolatile memory device such as flash memory or a memristor has been studied as a conductive synaptic device.

However, even though such a conductive synaptic device is used, when vector-matrix multiplication is performed by using the Ohm's law and the Kirchhoff's law, a large amount of power may be consumed.

In order to solve this problem, the present disclosure provides an artificial neural network device or a neuromorphic device that has a new structure including a capacitor-based synaptic array.

An example of related art includes Korea Patent Publication No. 10-2019-0051766 (Title of the invention: Neuron Circuit, system and method for synapse weight learning).

SUMMARY

The present disclosure provides an artificial neural network device that may perform matrix calculation through a capacitor-based synaptic array.

However, technical tasks to be achieved by the present embodiment are not limited to the technical task described above, and there may be other technical tasks.

According to an aspect of the present disclosure, a hardware-based artificial neural network device includes a synaptic array including a plurality of capacitor-based synaptic cells, each having a variable capacitance according to a recorded weight, a word line selection unit including a plurality of switching elements respectively connected to word lines of the synaptic array, a bit line charging unit including a plurality of switching elements, each being connected to one end of each of bit lines of the synaptic array, and a bit line discharging unit including a plurality of switching elements, each being connected to the other end of each of the bit lines of the synaptic array.

According to another aspect of the present disclosure, a matrix calculation device includes a synaptic array including a plurality of capacitor-based synaptic cells, each having a variable capacitance according to a recorded weight, a word line selection unit including a plurality of switching elements respectively connected to word lines of the synaptic array, a bit line charging unit including a plurality of switching elements, each being connected to one end of each of bit lines of the synaptic array, bit line discharging unit including a plurality of switching elements, each being connected to the other end of each of the bit lines of the synaptic array, and a control unit configured to control operations of the synaptic array, the word line selection unit, the bit line charging unit, and the bit line discharging unit.

BRIEF DESCRIPTION OF THE DRAWINGS

Various embodiments of the present disclosure will become more apparent in view of the attached drawings and accompanying detailed description, in which.

DETAILED DESCRIPTION OF THE EMBODIMENTS

Figure 1:
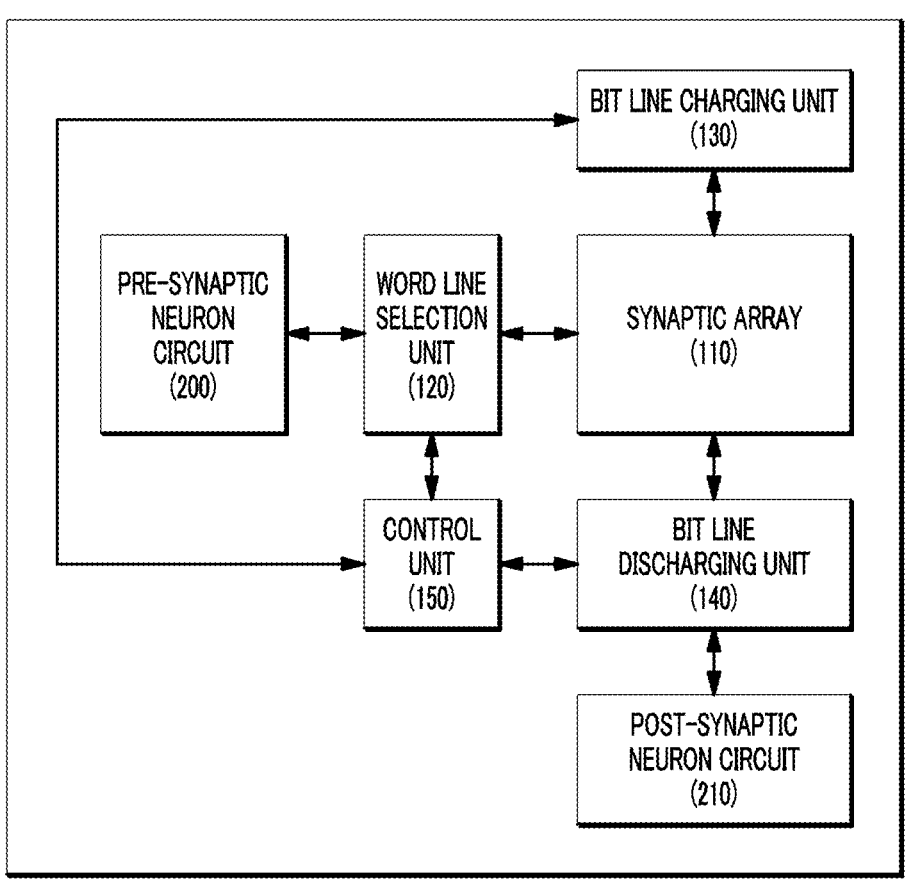
FIG. 1 is a block diagram illustrating a configuration of a hardware-based artificial neural network device according to an embodiment of the present disclosure.

Hereinafter, embodiments of the present application will be described in detail with reference to the accompanying drawings such that those skilled in the art to which the present belongs may easily implement the embodiments. However, the present application may be implemented in several different forms and is not limited to the embodiments described herein. In order to clearly describe the present application, parts irrelevant to the description are omitted in the drawings, and similar reference numerals are attached to similar parts throughout the specification.

Throughout the present application, when a portion is "connected" to another portion, this includes not only a case in which the portion is "directly connected" thereto but also a case in which the portion is "electrically connected" thereto with another portion interposed therebetween.

Throughout the present application, when it is described that a member is located "on" another member, this includes not only a case in which the member is in contact with another member but also a case in which there is another member between the two members.

A neuromorphic device according to the present disclosure is manufactured to mimic a human brain in hardware by using a semiconductor process and includes a synaptic element corresponding to a brain synapse, a neuron circuit corresponding to a neuron, and various peripheral circuits.

Hereinafter, embodiments of the present disclosure will be described in detail with reference to the accompanying drawings.

Figure 2:
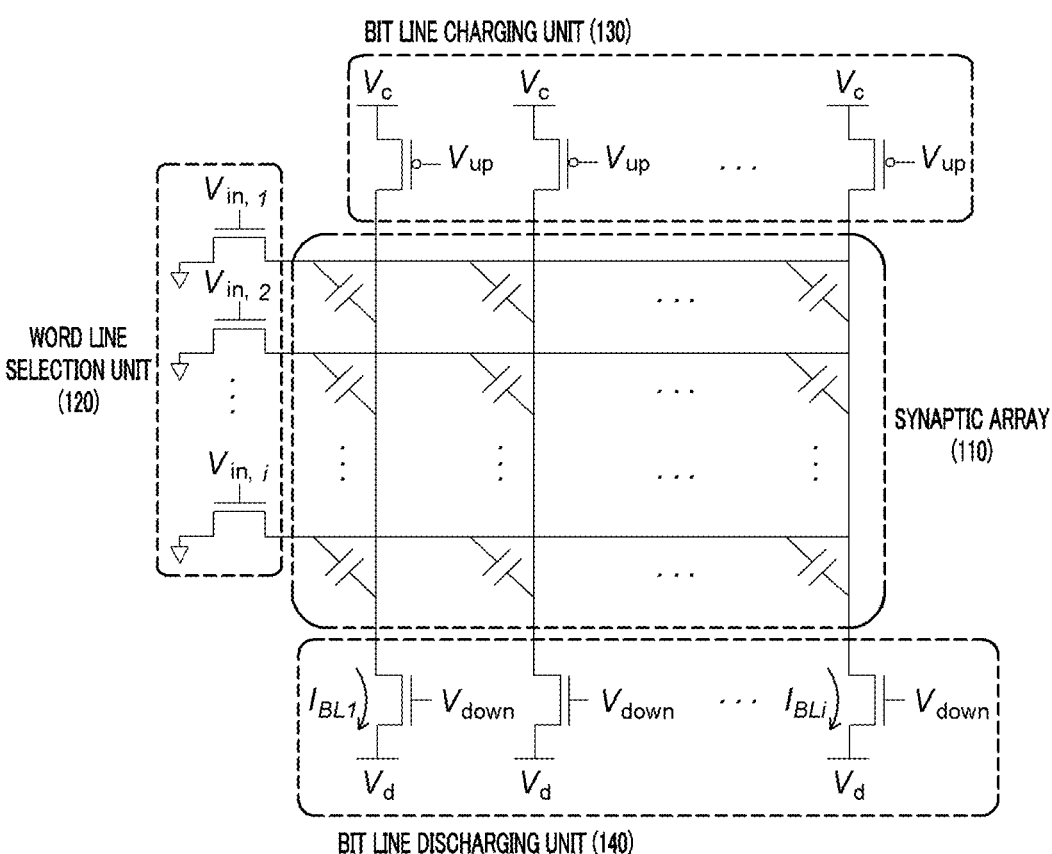
FIG. 2 illustrates a circuit configuration of the hardware-based artificial neural network device according to the embodiment of the present disclosure.

FIG. 1 is a block diagram illustrating a configuration of a hardware-based artificial neural network device according to an embodiment of the present disclosure, and FIG. 2 illustrates a circuit configuration of the hardware-based artificial neural network device according to the embodiment of the present disclosure.

As illustrated, a hardware-based artificial neural network device 100 includes a synaptic array 110, a word line selection unit 120, a bit line charging unit 130, a bit line discharging unit 140, and a control unit 150. In addition, the hardware-based artificial neural network device 100 may further include a pre-synaptic neuron circuit 200 and a post-synaptic neuron circuit 210.

The synaptic array 110 has the same function as the brain synapse and includes a plurality of capacitor-based synaptic cells. The synaptic array 110 has a cross-point array structure and capacitor-based synaptic cells are arranged at respective intersections. For example, the synaptic array 110 may include the number of synaptic cells obtained by multiplying the number of pre-synaptic neuronal circuits coupled to the synaptic array 110 by the number of post-synaptic neuronal circuits.

In this case, each of the capacitor-based synaptic cells is characterized in that a capacitance varies according to a weight to be recorded. The capacitor-based synaptic cells may be used regardless of a type thereof if a change in capacitance may be adjusted like non-volatile memory. Here, the weight refers to a weight that is multiplied by an input signal in a perceptron structure indicating an artificial neural network model and is additionally defined as a concept including a bias, which is a special weight having an input of 1.

Figure 5:
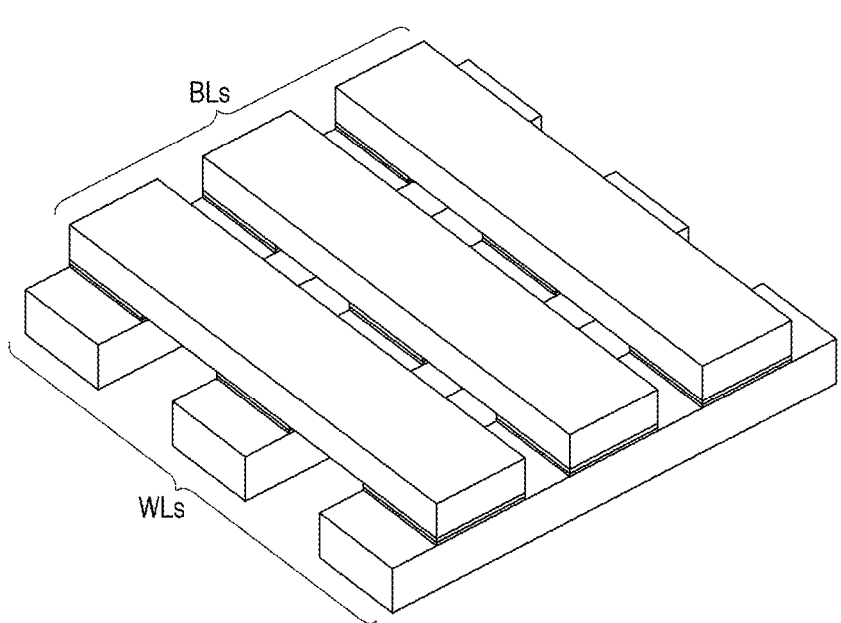
FIG. 5 is an example diagram illustrating an array structure of a capacitor-based synaptic cell according to an embodiment of the present disclosure.

For example, the synaptic cell of the present disclosure may be implemented in the form of a MOS capacitor having an oxide-nitride-oxide (ONO) stack structure as illustrated in FIG. 5. The MOS capacitor includes a charge storage layer formed of various types of materials, such as SiN and HfO$_2$, to control capacitances. In addition, the type of charges stored in the charge storage layer changes according to a polarity of a voltage applied to a gate of the MOS capacitor. When electrons enter the charge storage layer, a threshold voltage of the MOS capacitor increases, and when holes enter the charge storage layer, the threshold voltage decreases. In addition, a degree to which the threshold voltage is shifted changes depending on the amount of charges entering the charge storage layer.

The word line selection unit 120 includes a plurality of switching elements respectively connected to word lines of the synaptic array 110. One terminal of each switching element is grounded, and the other terminal is connected to the word line of the synaptic array 100. In addition, an output of the pre-synaptic neuron circuit 200 is applied to the gate of the switching element included in the word line selection unit 120. That is, a plurality of pre-synaptic neuron circuits 200 are provided, and a spike signal output from the pre-synaptic neuron circuit 200 is transmitted to the gate of each switching element. Accordingly, each switching element is turned on by the output of the pre-synaptic neuron circuit 200, and thereby, whether the word line is grounded is determined. When there is no output of the pre-synaptic neuron circuit 200, the switching element maintains a turned-off state, and a word line connected thereto has a floating state.

The bit line charging unit 130 includes a plurality of switching elements, each being connected to one end of each of bit lines in the synaptic array 110. One terminal of each of the switching elements is connected to a high-level power supply Vc, and the other terminal of each of the switching elements is connected to one end of each of the bit lines. As the switching elements included in the bit line charging unit 130 are activated, a high-level voltage is transmitted to synaptic cells via the switching elements, and thereby, the synaptic cells perform a charging operation. In this case, capacitances of the synaptic cells are controlled by weights, and thus, the amount of charges charged in the synaptic cells may be controlled by the weights.

The bit line discharging unit 140 includes a plurality of switching elements respectively connected to the other end of each of the bit lines in the synaptic array 110. One end of each of the switching elements is connected to a low-level power supply Vd, and the other end of each of the switching elements is connected to the other end of each of the bit lines. As the switching elements included in the bit line discharging unit 140 are activated, the low-level power supply Vd is connected to the synaptic cells via each of the switching elements, and thereby, the synaptic cells perform a discharging operation. In this case, capacitances of the synaptic cells are controlled by weights, and thus, the amount of charges charged in the synaptic cells may be controlled by the weights.

Meanwhile, the switching elements included in the bit line charging unit 130 may have different polarities from the switching elements included in the bit line discharging unit 140. For example, the switching elements included in the bit line charging unit 130 may be implemented in the form of PMOS transistors, and the switching elements included in the bit line discharging unit 140 may be implemented in the form of NMOS transistors, but the present disclosure is not limited thereto.

The control unit 150 controls operations of the word line selection unit 120, the bit line charging unit 130, and the bit line discharging unit 140, and through this, a matrix calculation is performed by using the synaptic array 110. This will be separately described with reference to FIG. 3.

In addition, the control unit 150 may perform an operation for programming weights for the synaptic array 110 and an operation for reading the stored weights. For example, the control unit 150 may adjust weights of the synapse array 110 by performing an operation, such as incremental step pulse program (ISPP) or incremental step pulse erase (ISPE) through various voltage supply modules (not illustrated) corresponding to a peripheral circuit of the synaptic array 110, and thereby, the capacitance of each synaptic cell 110 may be adjusted. In this way, the synaptic cell may be implemented as a semiconductor memory device in which capacitance is variable in response to an externally applied voltage.

The pre-synaptic neuron circuit 200 and the post-synaptic neuron circuit 210 have a general circuit configuration. For example, the pre-synaptic neuron circuit 200 and the post-synaptic neuron circuit 210 include a signal integrator for integrating a signal transmitted through a previous synapse and a comparator for comparing an integrated signal with a threshold, and so on. The pre-synaptic neuron circuit 200 and the post-synaptic neuron circuit 210 are configured to output spike signals according to an ignition operation when the comparison result of the comparator is greater than or equal to the threshold.

Figure 3:
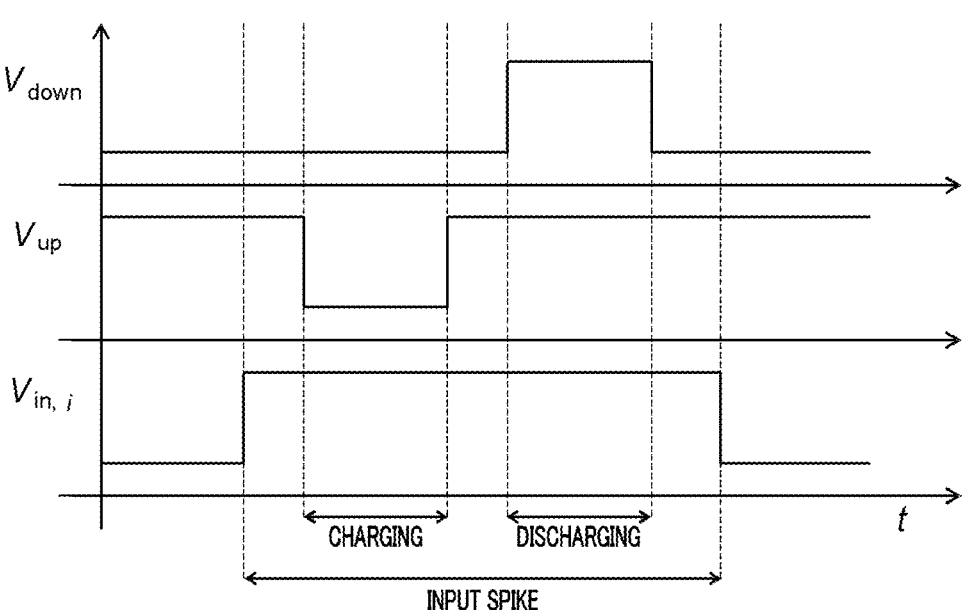
FIG. 3 is a timing diagram illustrating an operation method of a hardware-based artificial neural network device, according to an embodiment of the present disclosure.
Figure 4A:
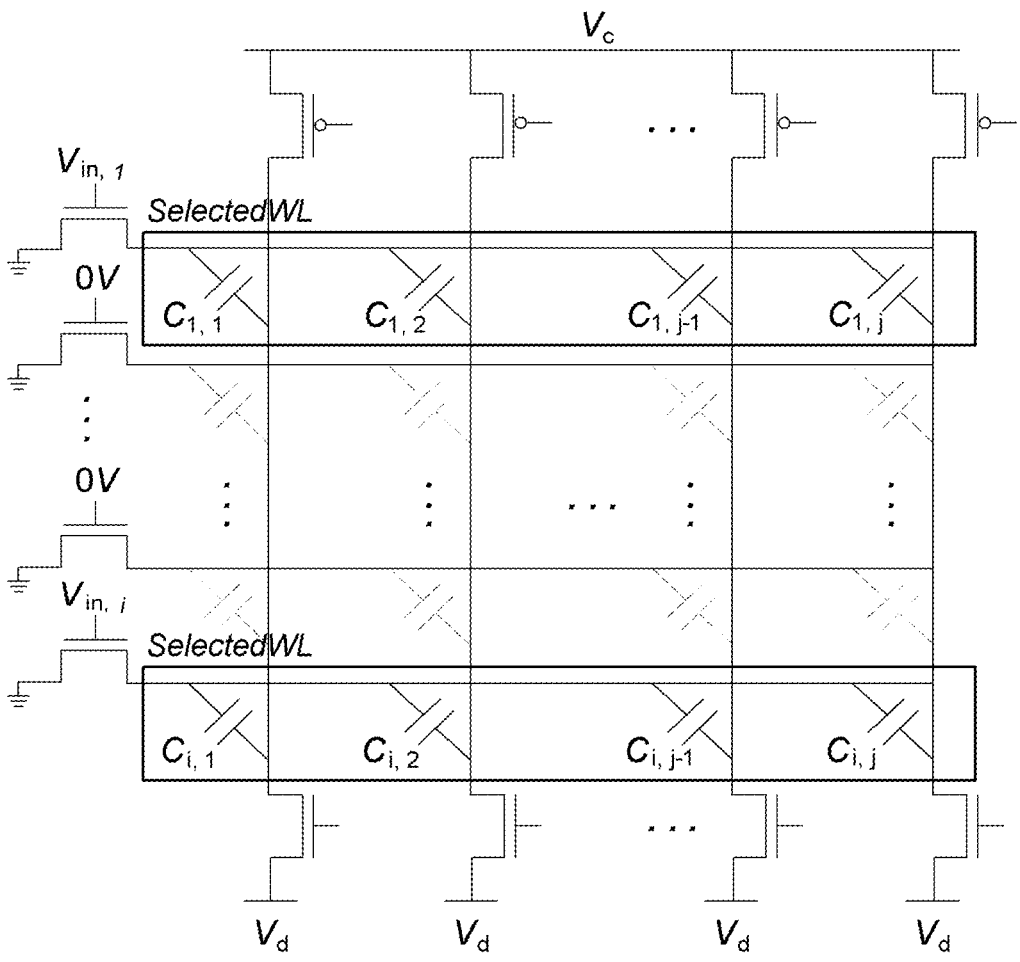
FIGS. 4A to 4C are circuit diagrams illustrating operation modes of a hardware-based artificial neural network device, according to an embodiment of the present disclosure.
Figure 4B:
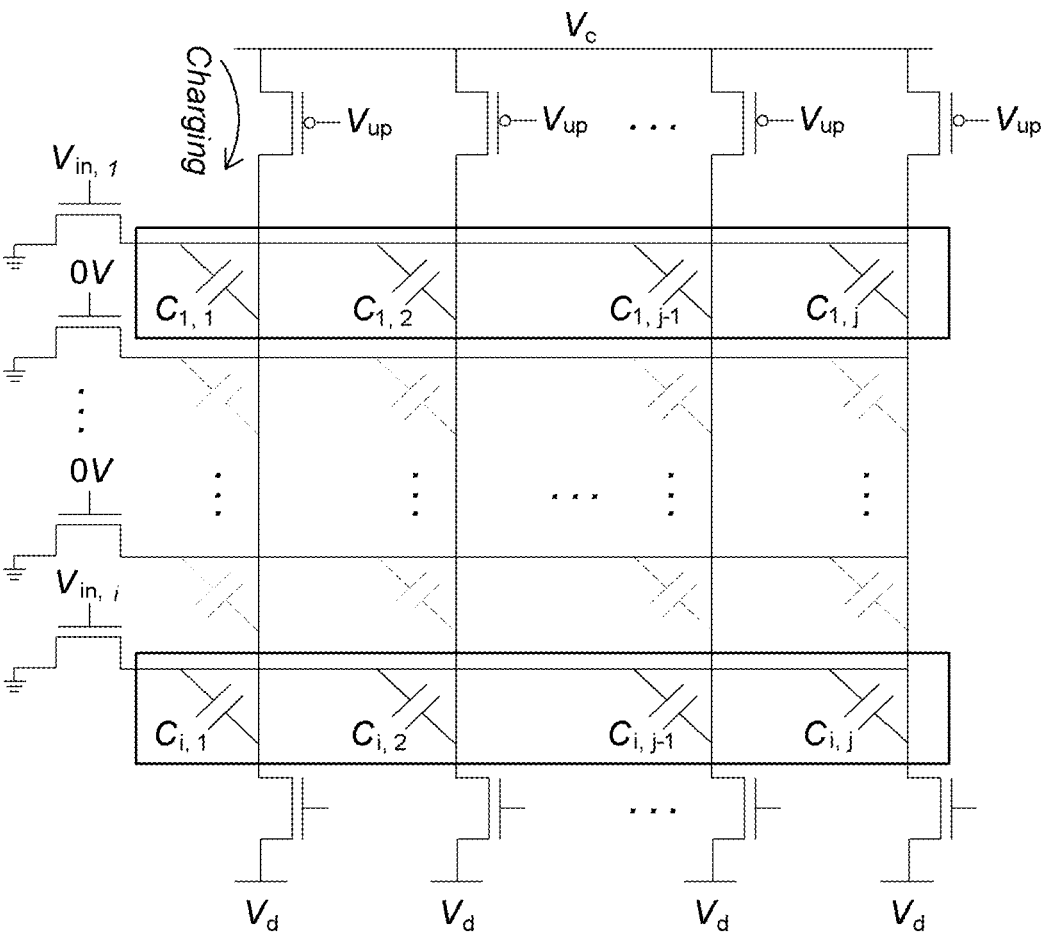
Figure 4C:
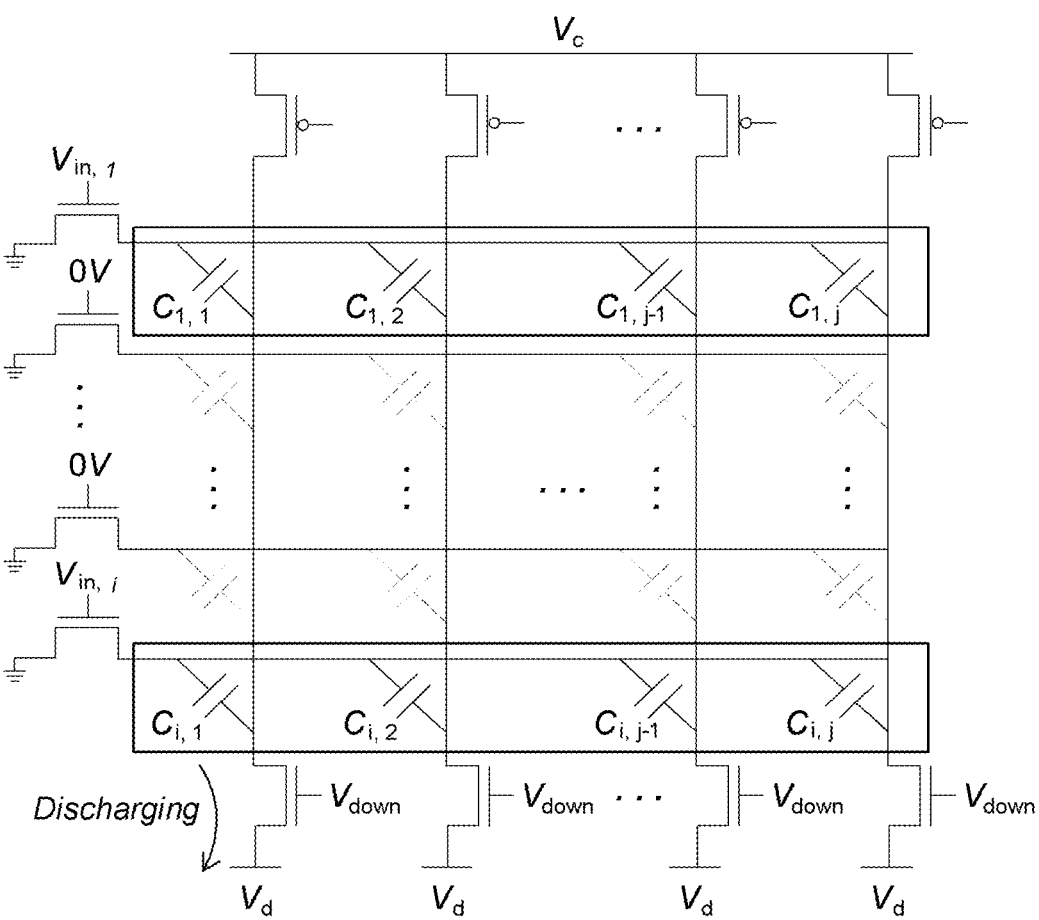

FIG. 3 is a timing diagram illustrating an operation method of a hardware-based artificial neural network device, according to an embodiment of the present disclosure, and FIGS. 4A to 4C are circuit diagrams illustrating operation modes of the hardware-based artificial neural network device, according to an embodiment of the present disclosure.

The control unit 150 drives the word line selection unit 120 to ground the word lines selected by an output of a pre-synaptic neuron connected to the synaptic array 110 for a first time. Accordingly, only the synaptic cells connected to the word line associated with the pre-synaptic neuron circuit 210 that outputs a spike signal have a ground state, and the other synaptic cells have a floating state. As such, when one or more word lines are selected, a plurality of capacitors are connected in parallel from the point of view of a bit line. The synaptic cells connected to the unselected word lines have a floating state, thereby not affecting a subsequent bit line charging or discharging operation.

Next, the control unit 150 drives the bit line charging unit 130 to charge capacitors of the synaptic cells connected to the selected word line for a second time. To this end, a switching signal Vup for turning on the switching element of the bit line charging unit 130 is applied for the second time.

Next, the control unit 150 drives the bit line discharging unit 140 to discharge capacitors of the synaptic cells connected to the selected word line for the third time. To this end, a switching signal Vdown for turning on the switching elements of the bit line discharging unit 140 is applied for the third time period.

In this case, as illustrated, a charging operation and a discharging operation for the first time are sequentially performed.

The amount of charges discharged in units of bit lines of the synaptic array 110 according to the operation of the control unit 150 described above is substantially equal to a value obtained by matrix-multiplying the weight of each synaptic cell by an output of a pre-synaptic neuron.

A voltage of the bit line may change from Vc to Vd according to operations of the bit line charging unit 130 and the bit line discharging unit 140, and a charge change amount $\Delta Q_i$ of the j-th bit line may be detected in the form of a bit line current Ij(t), which may be represented by Equation 1 below. In this case, the bit line current is transmitted to the post-synaptic neuron circuit 210, and as a result, an output of the pre-synaptic neuron represents a value that is matrix-multiplied by a weight of each synaptic cell.

$$\Delta Q_j = \sum_i \int_{V_d}^{V_c} \delta_i C_{i,j} dV = \int_{t_0}^{t_1} I_j(t) dt \qquad \text{Equation 1}$$

$$\delta_i = \begin{cases} 0, & \text{if } V_{in,i} = 0 \\ 1, & \text{otherwise} \end{cases} \qquad \text{Equation 2}$$

$\delta_i$ defined in Equation 2 is a spike signal transmitted through the pre-synaptic neuron circuit 200 and indicates an input signal from the point of view of the synaptic array 110. In this case, i represents an identification number of each word line.

In addition, $C_{i,j}$ represents a capacitance of a capacitor-based synaptic cell, the capacitance of the capacitor-based synaptic cell varies depending on a weight, as described above.

As such, an output current of a bit line is determined by presence or absence of an input signal transmitted from the pre-synaptic neuron circuit 200 and a capacitance adjusted according to the weight of each synapse, and thus, a vector matrix multiplication that is multiplication of the weight of each synapse and the input signal may be implemented by a circuit.

FIGS. 6A to 6D are graphs illustrating characteristics of a device using a capacitor-based synaptic cell, according to an embodiment of the present disclosure.

Figure 6A:
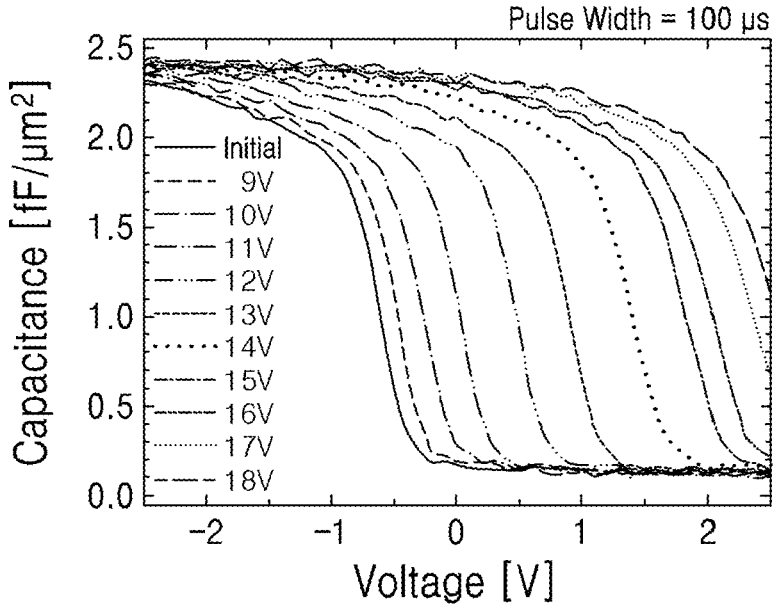
FIGS. 6A to 6D are graphs illustrating characteristics of a device using a capacitor-based synaptic cell, according to an embodiment of the present disclosure.
Figure 6B:
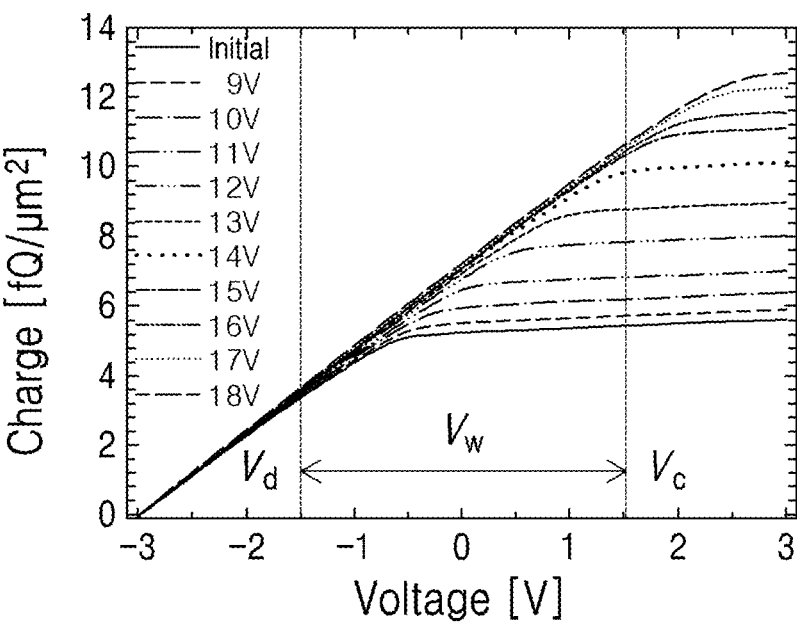

FIG. 6A is a graph illustrating a relationship between a voltage and a capacitance of a capacitor-based synaptic cell. The relationship between the voltage and the capacitance is similar to a relationship therebetween in a general capacitor, and it can be seen that when a weight of a synaptic cell increases according to an increase in a program voltage applied to the synaptic cell, the graph is shifted to the right. In other words, as illustrated in FIG. 6B, a relationship between the amount of charges in a capacitor and a voltage may be illustrated, and it can be seen that, as a weight increases, a difference in the amount of charges according to charging Vc and discharging Vd increases. This corresponds to data which experimentally proves that the amount of charges charged in each capacitor increases in proportion to the capacitance adjusted according to the weight of the synaptic cell as described above.

Figure 6C:
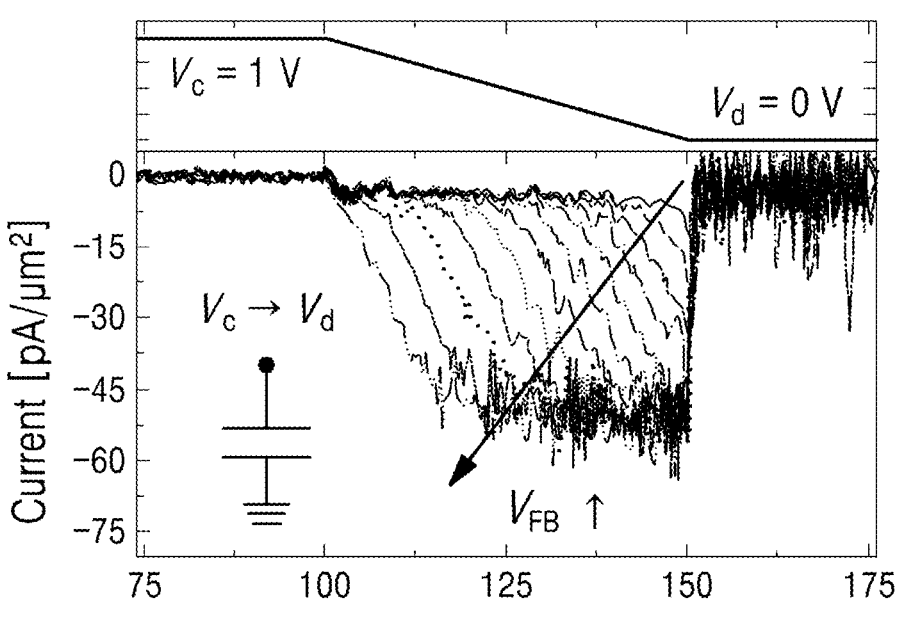

FIG. 6C illustrates a current flowing through each bit line according to time, and it can be seen that a discharge current increases as the weight recorded in each synaptic cell increases.

Figure 6D:
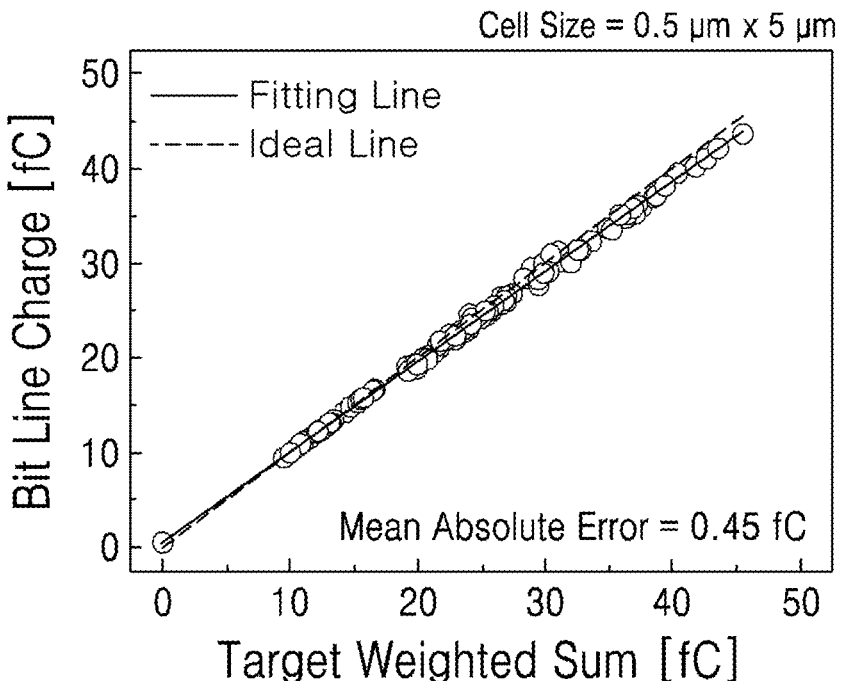

FIG. 6D illustrates that an x axis denotes the sum of weights and a y axis denotes an integration result $\Delta Q$ of a current discharged from a bit line (BL), and it can be seen that the two results coincide with each other with very little error.

Figure 7:
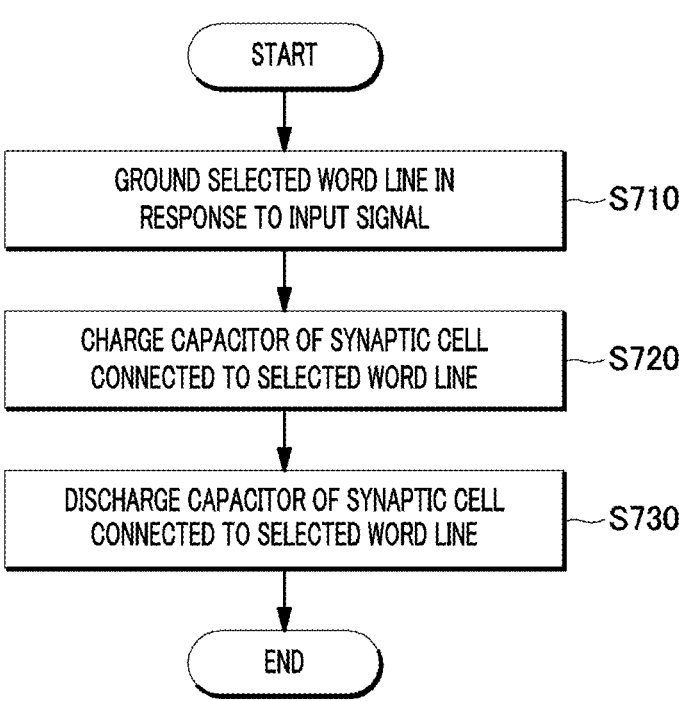
FIG. 7 is a flowchart illustrating an operation method of a hardware-based artificial neural network device, according to an embodiment of the present disclosure.

FIG. 7 is a flowchart illustrating an operation method of a hardware-based artificial neural network device, according to an embodiment of the present disclosure.

First, word lines selected in response to an input signal transmitted through a pre-synaptic neuron circuit are grounded for a first time (S710). Accordingly, one end of each of synaptic cells connected to the word lines to which the input signal is applied is grounded, and thereafter, charging may be performed by the bit line charging unit 130.

Next, while one end of each of the selected synaptic cells maintain a ground state, the bit line charging unit 130 is activated to charge capacitors of the selected synaptic cells to a high level (S720). In this case, switching elements included in the bit line charging unit 130 are simultaneously activated in parallel, and thereby, a faster charging operation is performed.

Next, while one end of each of the selected synaptic cells maintains the ground state, the bit line discharging unit 140 is activated to discharge the charges charged in the capacitors of the selected synaptic cells (S730). Accordingly, a bit line current corresponding to a current obtained by multiplying the input signal by a weight is output and transmitted to a post-synaptic neuron circuit.

Meanwhile, before the preceding step (S710) is performed, a program operation or so on for setting weights of the respective synaptic cells may be preceded, and thereby, capacitances of capacitors of the respective synaptic cells are determined. The bit line currents according to operations of the bit line charging unit 130 and the bit line discharging unit 140 are determined by the capacitances of the capacitors of the synaptic cells.

Meanwhile, the hardware-based artificial neural network device according to the present disclosure may be referred to as a neuromorphic device and may be applied as a matrix calculation device for performing a vector matrix multiplication in an artificial neural network.

According to the present disclosure, a capacitor-based synaptic array is used, and thus, a leakage current may be reduced compared to other memristor-based synaptic devices, such as phase change random access memory (PRAM) and resistive random access memory (RRAM), due to a high resistance of a capacitor itself. Accordingly, an error of vector/matrix multiplication may be greatly reduced, and energy consumption may be significantly reduced compared to operation of a neural network in a known computing system.

Although the method and system according to the present disclosure are described with reference to some embodiments, some or all of components or operations thereof may be implemented by using a computer system having a general purpose hardware architecture.

The above descriptions on the present application are examples, and those skilled in the art to which the present application belongs may understand that the examples may be easily modified into other specific forms without changing the technical idea or essential features of the present application. Therefore, it should be understood that the embodiments described above are illustrative in all respects and not restrictive. For example, each component described as a single type may be implemented in a distributed form, and likewise components described in the distributed form may be implemented in a combined form.

The scope of the present application is indicated by the following claims rather than the detailed description made above, and all changes or modifications derived from the meaning and scope of the claims and their equivalent concepts should be interpreted as being included in the scope of the present application.

What is claimed is:

1. A hardware-based artificial neural network device comprising:
   a synaptic array including a plurality of capacitor-based synaptic cells, each having a variable capacitance according to a recorded weight;
   a word line selection unit including a plurality of switching elements respectively connected to word lines of the synaptic array;
   a bit line charging unit including a plurality of switching elements, each being connected to one end of each of bit lines of the synaptic array;
   a bit line discharging unit including a plurality of switching elements, each being connected to the other end of each of the bit lines of the synaptic array; and
   a controller configured to control an operation of the artificial neural network device,
   wherein the controller drives the word line selection unit to perform an operation of grounding word lines selected by an output of a pre-synaptic neuron connected to the synaptic array for a first time and drives the bit line charging unit to perform an operation of charging a capacitor of the synaptic cell connected to the selected word line for a second time and drives the bit line discharging unit to perform an operation of discharging the capacitor of the synaptic cell connected to the selected word line for a third time, and
   the operation of charging and the operation of discharging are performed sequentially for the first time.

2. The hardware-based artificial neural network device of claim 1, wherein the synaptic cell is implemented by a semiconductor memory device of which capacitance is variable according to an externally applied voltage.

3. The hardware-based artificial neural network device of claim 1, wherein the word line selection unit grounds a selected word line of the synaptic array according to an output of a pre-synaptic neuron and maintains unselected word lines in a floating state.

4. The hardware-based artificial neural network device of claim 1, wherein
   the bit line charging unit includes a plurality of switching elements having a first polarity, each applying a first voltage to one end of the bit line, and
   the bit line discharging unit includes a plurality of switching elements having a second polarity, each applying a second voltage to the other end of the bit line, and
   wherein the first voltage is at a level higher than the second voltage.

5. The hardware-based artificial neural network device of claim 1, wherein, according to the operation of the controller, a current output on a bit line unit of the synaptic array mimics a value obtained by matrix-multiplying an output of a pre-synaptic neuron with a weight of each of the synaptic cells.

6. A matrix calculation device comprising:
   a synaptic array including a plurality of capacitor-based synaptic cells, each having a variable capacitance according to a recorded weight;
   a word line selection unit including a plurality of switching elements respectively connected to word lines of the synaptic array;
   a bit line charging unit including a plurality of switching elements, each being connected to one end of each of bit lines of the synaptic array;
   a bit line discharging unit including a plurality of switching elements, each being connected to the other end of each of the bit lines of the synaptic array; and
   a controller configured to control operations of the synaptic array, the word line selection unit, the bit line charging unit, and the bit line discharging unit,
   wherein the controller activates the switching elements of the word line selection unit in response to an input signal transmitted to the synaptic array to ground selected word lines for a first time and sequentially performs an operation of driving the bit line charging unit to charge capacitors of the synaptic cells connected to the selected word line for a second time and an operation of driving the bit line discharging unit to discharge the capacitors of the synaptic cells connected to the selected word line for a third time.

7. The matrix calculation device of claim 6, wherein the controller adjusts a capacitance of each of the synaptic cells by adjusting the weight of each of the synaptic cells.

8. The matrix calculation device of claim 6, wherein a current output in unit of the bit line of the synaptic array according to the operation of the controller mimics a value obtained by matrix-multiplying a weight of each of the synaptic cells by an output of a pre-synaptic neuron.

9. The matrix calculation device of claim 6, wherein the word line selection unit grounds a selected word line of the synaptic array according to an output of a pre-synaptic neuron and maintains unselected word lines in a floating state.

10. The matrix calculation device of claim 6, wherein
    the bit line charging unit includes a plurality of switching elements having a first polarity, each applying a first voltage to one end of the bit line, and
    the bit line discharging unit includes a plurality of switching elements having a second polarity, each applying a second voltage to the other end of the bit line, and wherein the first voltage is at a level higher than the second voltage.

* * * * *